US009347265B2

(12) United States Patent
De Jong et al.

(10) Patent No.: US 9,347,265 B2
(45) Date of Patent: *May 24, 2016

(54) TOP DRIVE SYSTEMS FOR WELLBORE AND DRILLING OPERATIONS

(71) Applicant: National Oilwell Varco L.P., Houston, TX (US)

(72) Inventors: Bastiaan De Jong, Rancho Santa Margarita, CA (US); Arthur William Braman, Jr., Cypress, CA (US)

(73) Assignee: National Oilwell Varco, L.P., Houston, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/288,923

(22) Filed: May 28, 2014

(65) Prior Publication Data

US 2014/0274549 A1 Sep. 18, 2014

Related U.S. Application Data

(60) Continuation of application No. 13/004,955, filed on Jan. 12, 2011, now Pat. No. 8,839,854, which is a division of application No. 12/005,032, filed on Dec. 21, 2007, now abandoned.

(51) Int. Cl.
*E21B 3/02* (2006.01)
*F16H 1/28* (2006.01)

(52) U.S. Cl.
CPC ... *E21B 3/02* (2013.01); *F16H 1/28* (2013.01)

(58) Field of Classification Search
CPC ............ E21B 3/02; E21B 19/08; E21B 19/02
See application file for complete search history.

(56) References Cited

U.S. PATENT DOCUMENTS

| 4,458,768 | A | * | 7/1984 | Boyadjieff ...................... 175/85 |
| 4,529,045 | A | * | 7/1985 | Boyadjieff et al. ........... 173/164 |
| 4,589,503 | A | * | 5/1986 | Johnson et al. ............... 175/113 |
| 4,756,300 | A | * | 7/1988 | Ewers ........................... 126/567 |
| 4,800,968 | A | * | 1/1989 | Shaw et al. ..................... 175/85 |
| 4,807,890 | A | * | 2/1989 | Gorman et al. ............... 277/346 |
| 4,813,493 | A | * | 3/1989 | Shaw et al. .................... 173/164 |
| 4,872,517 | A | * | 10/1989 | Shaw et al. .................... 173/218 |
| 4,878,546 | A | * | 11/1989 | Shaw et al. .................... 173/213 |
| 4,984,641 | A | * | 1/1991 | Pryor ............................. 175/170 |
| 5,433,279 | A | * | 7/1995 | Tessari et al. ................. 173/213 |
| 6,007,105 | A | * | 12/1999 | Dietle et al. ..................... 285/94 |
| 6,276,450 | B1 | * | 8/2001 | Seneviratne ................. 166/85.1 |
| 6,536,520 | B1 | * | 3/2003 | Snider et al. ................. 166/78.1 |
| 6,679,333 | B2 | * | 1/2004 | York et al. ..................... 166/379 |
| 6,705,405 | B1 | * | 3/2004 | Pietras .......................... 166/380 |
| 6,913,096 | B1 | * | 7/2005 | Nielsen et al. .................. 175/85 |

(Continued)

*Primary Examiner* — Elizabeth Gitlin
(74) *Attorney, Agent, or Firm* — Amerson Law Firm, PLLC

(57) ABSTRACT

A gear system has a gear housing and a lower planetary carrier disposed in the gear housing, the lower planetary carrier being adapted to rotate relative to the gear housing. A top drive system is operatively coupled to the gear system, the top drive system having a top drive shaft that is adapted to be driven by the gear system. A single bearing that is adapted to facilitate rotation of the lower planetary carrier is positioned between the gear housing and the lower planetary carrier. A motor apparatus is operatively coupled to and adapted to drive the gear system by rotating the lower planetary carrier relative to the gear housing, wherein a rotational axis of the single bearing is adapted to move in a lateral translational direction with respect to the gear housing while the motor apparatus is rotating the lower planetary carrier.

19 Claims, 10 Drawing Sheets

(56) References Cited

U.S. PATENT DOCUMENTS

| | | | |
|---|---|---|---|
| 6,923,254 B2 * | 8/2005 | Morrow et al. | 166/88.4 |
| 7,188,686 B2 * | 3/2007 | Folk et al. | 175/162 |
| 7,270,189 B2 * | 9/2007 | Brown et al. | 166/380 |
| 7,320,374 B2 * | 1/2008 | Folk et al. | 175/220 |
| 2005/0279507 A1 * | 12/2005 | Folk et al. | 166/378 |

* cited by examiner

TOP DRIVE SYSTEMS FOR WELLBORE AND DRILLING OPERATIONS

CROSS REFERENCE TO RELATED APPLICATIONS

This application is a continuation of U.S. patent application Ser. No. 13/004,955 filed Jan. 12, 2011, which was a divisional application of U.S. patent application Ser. No. 12/005,032 filed on Dec. 21, 2007, which is incorporated by reference herein for all it discloses.

BACKGROUND OF THE INVENTION

1. Field of the Invention

This invention is directed to top drive systems; parts thereof; and methods of their use.

2. Description of Related Art

The prior art discloses a variety of top drive systems; for example, and not by way of limitation, the following U.S. patent application and U.S. patents present exemplary top drive systems and components thereof: U.S. Pat. Nos. 4,458,768; 4,589,503; 4,753,300; 4,800,968; 4,807,890; 4,813,493; 4,872,577; 4,878,546; 4,984,641; 5,433,279; 6,007,105; 6,276,450; 6,536,520; 6,679,333; 6,705,405; 6,913,096; 6,923,254; 7,186,686; and 7,270,189 all incorporated fully herein for all purposes.

Certain typical prior top drive drilling systems have a derrick supporting a top drive which rotates tubulars, e.g., drill pipe. The top drive is supported from a traveling block beneath a crown block. A drawworks on a rig floor raises and lowers the top drive. The top drive moves on a guide track.

Certain prior systems include a top drive with a gear system with a lower or second stage planetary carrier which rotates with respect to multiple (e.g. two) vertically spaced-apart bearings which are secured in place and which do not float radially (or axially).

BRIEF SUMMARY OF THE INVENTION

The following presents a simplified summary of the present disclosure in order to provide a basic understanding of some aspects of the invention. This summary is not an exhaustive overview of the disclosure, nor is it intended to identify key or critical elements of the subject matter disclosed here. Its sole purpose is to present some concepts in a simplified form as a prelude to the more detailed description that is discussed later.

The present disclosure is generally directed to certain illustrative aspects of a top drive system that may be used during wellbore operations. In one exemplary embodiment, a system is disclosed that includes a gear system having a gear housing and a lower planetary carrier disposed in the gear housing, the lower planetary carrier being adapted to rotate relative to the gear housing. The illustrative system also includes, among other things, a top drive system that is operatively coupled to the gear system, the top drive system having a top drive shaft that is adapted to be driven by the gear system. Additionally, a single bearing is positioned between the gear housing and the lower planetary carrier, the single bearing being adapted to facilitate a rotation of the lower planetary carrier relative to the gear housing. Furthermore, a motor apparatus is operatively coupled to the gear system, the motor apparatus being adapted to drive the gear system by rotating the lower planetary carrier relative to the gear housing, wherein a rotational axis of the single bearing is adapted to move in a lateral translational direction with respect to the gear housing while the motor apparatus is rotating the lower planetary carrier and while the gear system is driving the top drive shaft.

In another embodiment of the present disclosure, a system is disclosed that includes a gear system having a gear housing and a lower planetary carrier disposed in the gear housing, the lower planetary carrier being adapted to rotate relative to said gear housing. The system further includes, among other things, a single bearing positioned between the gear housing and the lower planetary carrier, the single bearing being adapted to facilitate a rotation of the lower planetary carrier relative to the gear housing, and a bearing cartridge that is adapted to maintain the single bearing in position between the gear housing and said lower planetary carrier. The bearing cartridge includes an outer part that is releasably secured to the gear housing and a radially movable inner part that is encompassed by the outer part, wherein the single bearing abuts the radially movable inner part. Furthermore, the system also includes a motor operatively coupled to the gear system, the motor being adapted to rotate the lower planetary carrier relative to the gear housing, wherein a rotational axis of the single bearing and a centerline axis of the radially movable inner part are adapted to move in respective lateral translational directions during the rotation of the lower planetary carrier relative to the gear housing.

BRIEF DESCRIPTION OF THE DRAWINGS

The disclosure may be understood by reference to the following description taken in conjunction with the accompanying drawings, in which like reference numerals identify like elements, and in which.

Figure 1A:
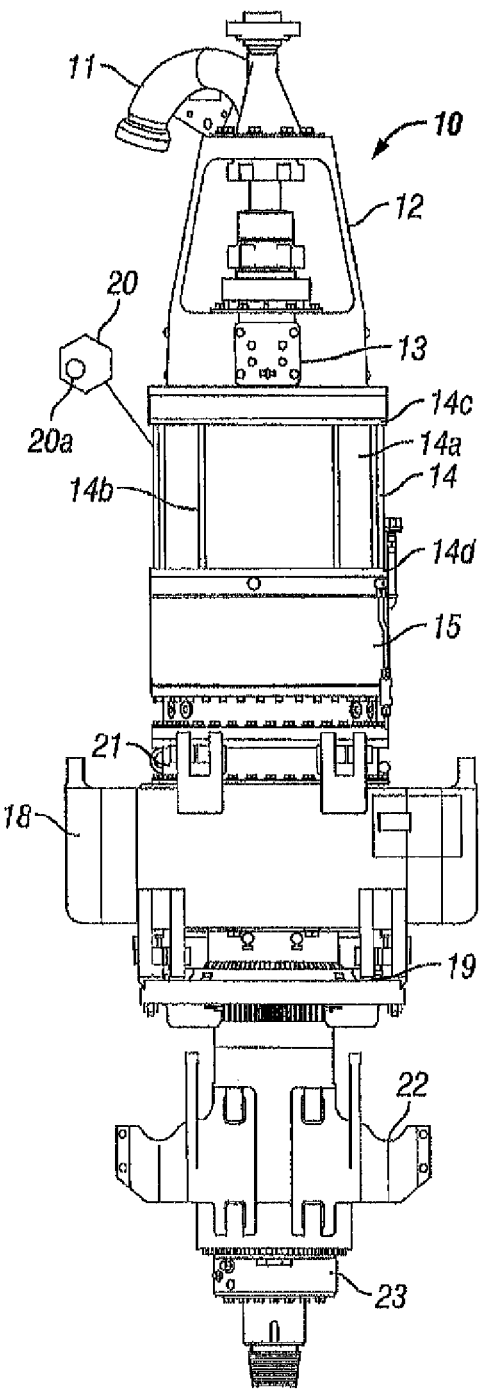
FIG. 1A is a back view of a top drive system according to the present invention.
Figure 1B:
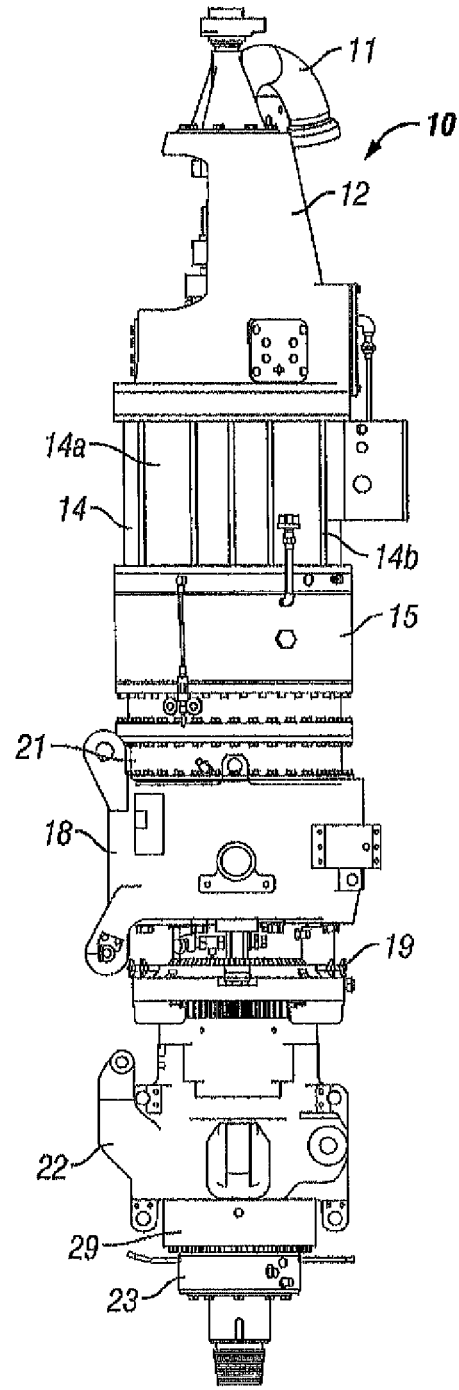
FIG. 1B is a side view of the top drive system of FIG. 1A.
Figure 1C:
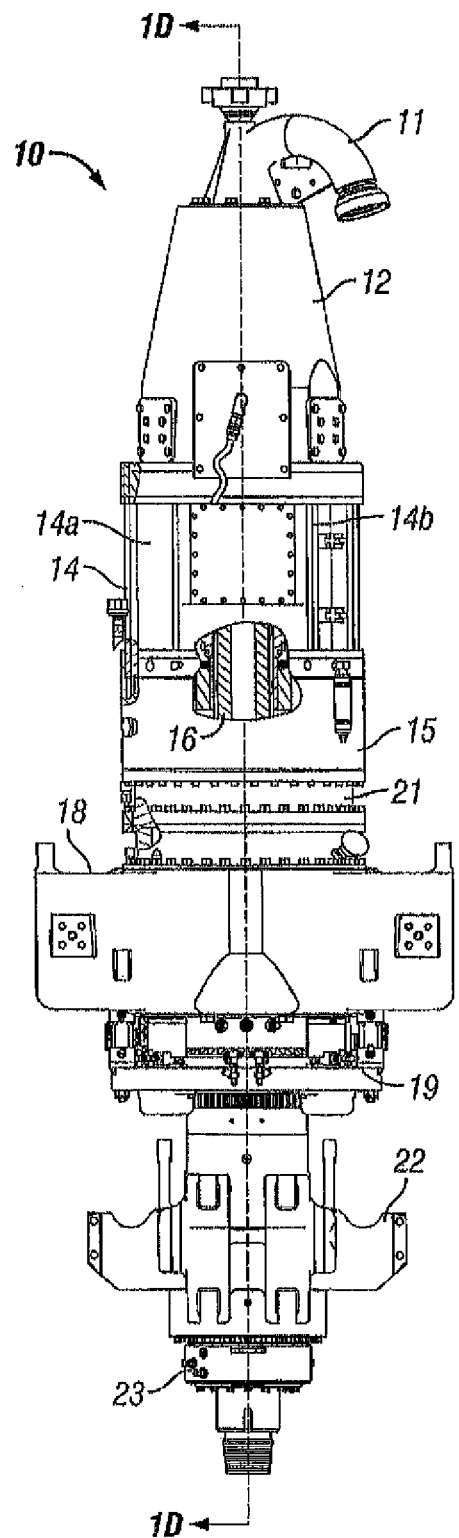
FIG. 1C is a front view of the top drive system of FIG. 1A.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIGS. 1A-1D illustrate a top drive system 10 according to the present invention which has a plurality of components including: a gooseneck 11, a bonnet 12, brakes 13, a motor 14, a gear system 15, a drive shaft 16, a bearing system 17, a swivel body 18, a pipe handler lock assembly 19, a link support 22, a swivel ring 23 and a load (or landing) collar 29. The components can be collectively suspended in a typical derrick from a typical traveling block for up and down movement in the derrick.

During certain operations, the motor 14 within a housing 14a rotates the drive shaft 16 which, in turn, rotates a drill string and a drill bit to produce an earth bore. Fluid pumped into the top drive system through the gooseneck 11 passes through the drive shaft 16, a drill string, and a drill bit and enters the bottom of an earth bore.

In certain aspects, the motor housing 14a (e.g. made of sheet metal or aluminum) includes a series of tie rods 14b which are secured to a top member 14c and a bottom member 14d to strengthen the housing 14a. In certain particular aspects the housing 14a is made of metal such as aluminum or steel. In one particular aspect the motor 14 is a motor as disclosed in U.S. Pat. No. 7,188,686. In another particular aspect the motor 14 (as may be any motor herein) is a salient pole permanent magnet motor.

The gear system 15 is located above a bearing retainer 21 which serves to maintain the drive shaft 16 in place (radially and axially) e.g. during drilling, and houses an upper race of a thrust bearing system 16b. As shown in FIG. 1D, the bearing retainer is a separate item secured to and below the housing of the gear system 15. As discussed in detail below, in one embodiment of the present invention, a bearing retainer is made integral with the gear system housing. A load flange 16a of the drive shaft 16 moves on bearings 16c.

An encoder/resolver 24 (see FIG. 1D) measures the position and speed of the motor 14 and provides a signal indicative of the position of the drive shaft 16. With certain salient pole motors, the encoder/resolver 24 can be deleted since motor controls for salient pole permanent magnet motors indicate the position of the rotor of the motor and, therefore, the position of the drive shaft 16 (e.g., the position of the drive shaft during tubular connection make-up and break-out and during drilling). Certain typical salient pole motors (with embedded tangential or radial rotor magnets) have relatively higher inductance than non-salient motors and provide smoother starting from a standstill.

The top drive system 10 has a motor control system 20 (shown schematically, FIG. 1A) which, in certain aspects, includes an output reactor 20a (also called an "inductor") which insures efficient operation by increasing the inductance applied to the motor. This inductor is used with certain low inductance motors. In other aspects, by using a relatively high inductance motor, e.g. a relatively high inductance salient pole motor, the inductor 20a is eliminated since the high inductance motor applies a sufficient amount of inductance.

Figure 1D:
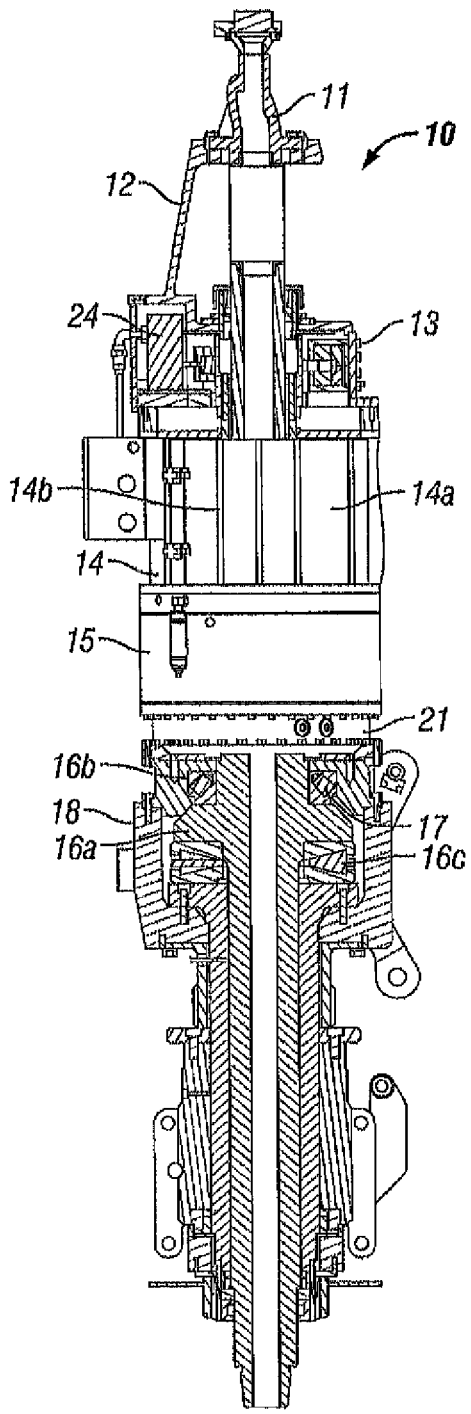
FIG. 1D is a cross-section view along line 1D-1D of FIG. 1C.
Figure 2A:
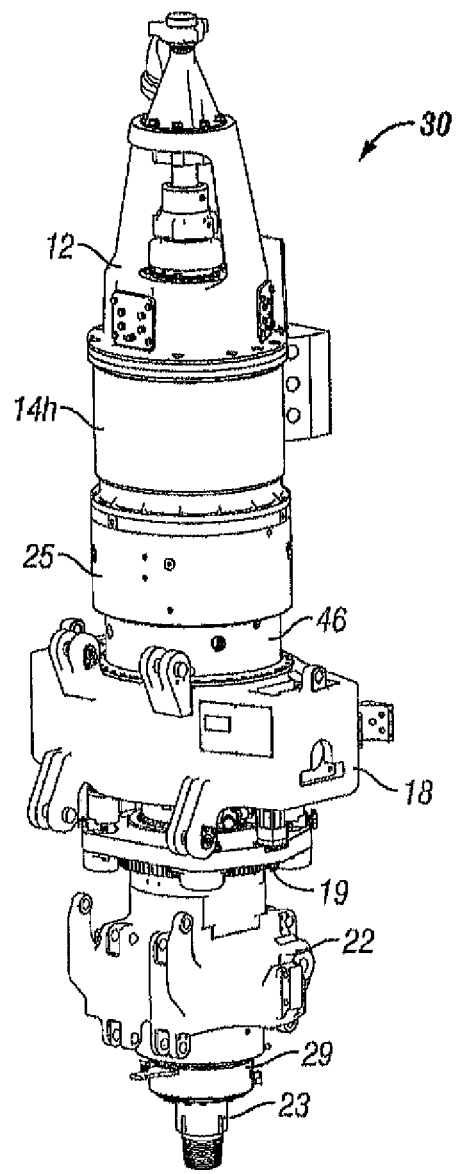
FIG. 2A is a perspective view of a top drive system according to the present invention with a motor/gear apparatus according to the present invention.
Figure 2B:
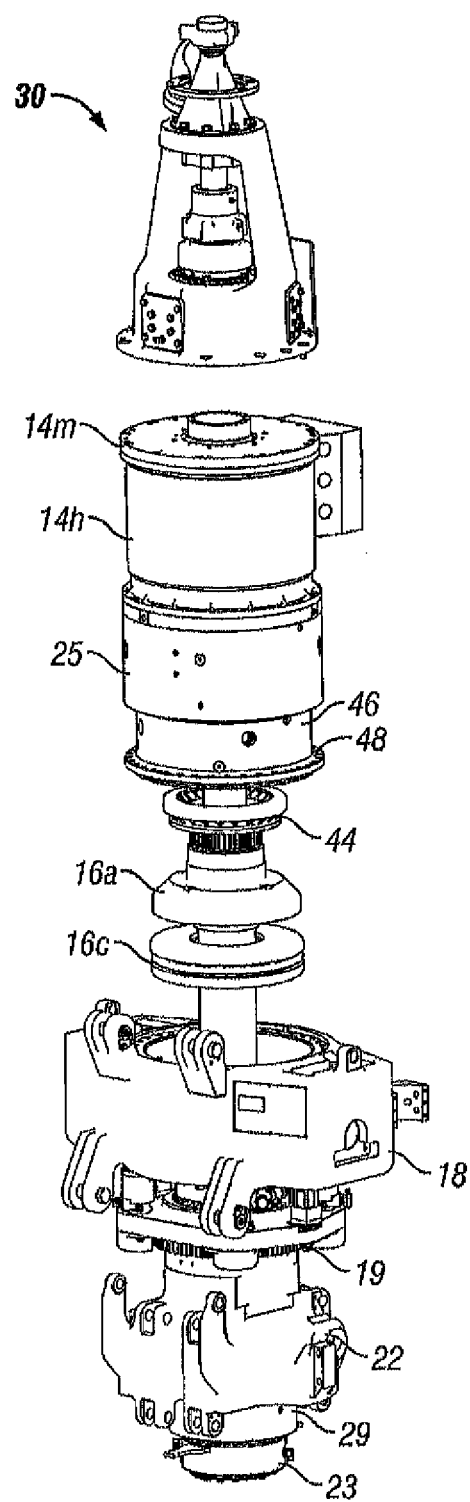
FIG. 2B is a partially exploded view of the top drive system and motor/gear apparatus shown in FIG. 2A.
Figure 2C:
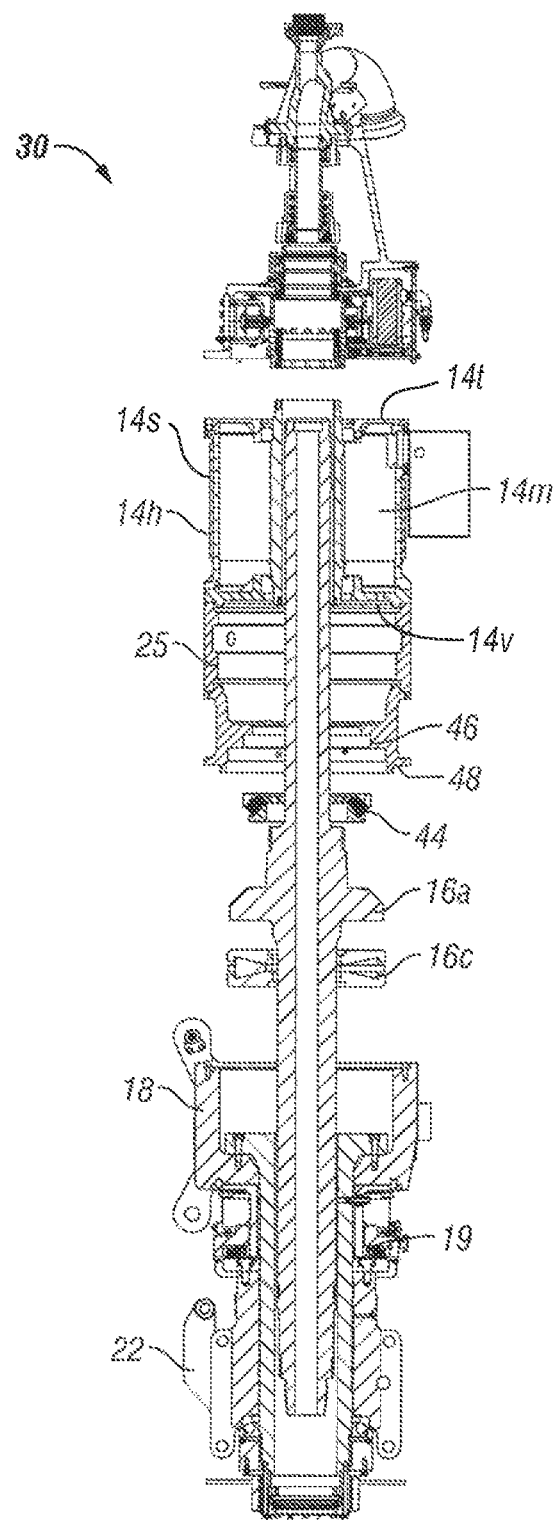
FIG. 2C is a cross-section view of the system of FIG. 2A.
Figure 2D:
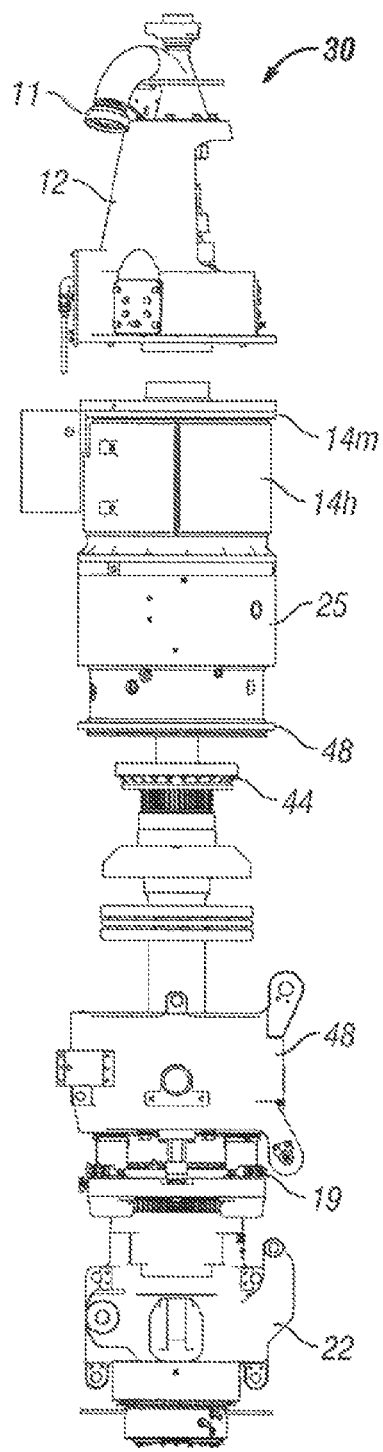
FIG. 2D is a side view of the system of FIG. 2A.
Figure 2E:
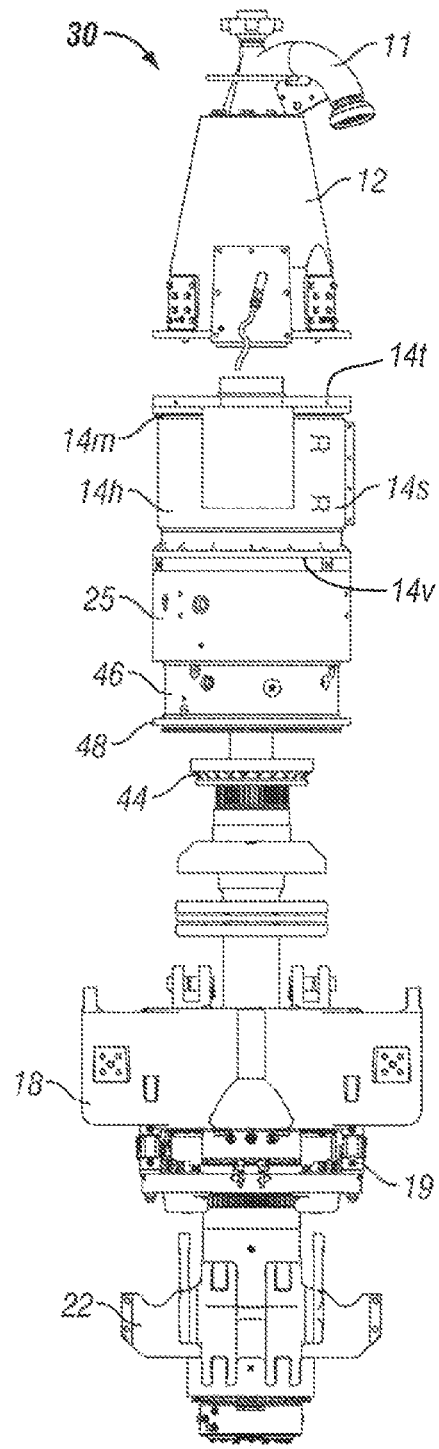
FIG. 2E is a front view of the system of FIG. 2A.

FIG. 2A-2D shows a top drive system 30 according to the present invention which, in some aspects, is like the system 10, FIG. 1A (and like numerals indicate like parts). A motor 14m (like any of the motors 14) is above a gear system 25 (instead of the gear system 15) has a housing 14h.

Parts of the housing 14h including sides 14s, top 14t, and bottom 14v following assembly are not connected together by tie rods (as are housing parts in the top drive of FIG. 1A). In one aspect the housing 14h is made of steel and is sufficiently strong so that a portion of it is threaded to threadedly connect the bonnet 12 thereto. A steel housing motor can be relatively larger than a motor with a weaker (e.g. aluminum) housing. This novel elimination of tie rods allows a motor of a greater diameter (larger size) to be used in a similar space. This relatively larger diameter means that the motor provides relatively greater horsepower with greater efficiency.

A lower portion 48 of a gear housing 46 serves as a bearing retainer to retain bearing 44. FIGS. 2A-2D are exploded views or views that show parts not assembled together.

When assembled, the bearing 44 is within a bearing retainer 48. The bearing retainer, a lower portion 48 of the housing 46 is releasably secured to the housing 46, e.g. with bolts.

Figure 3:
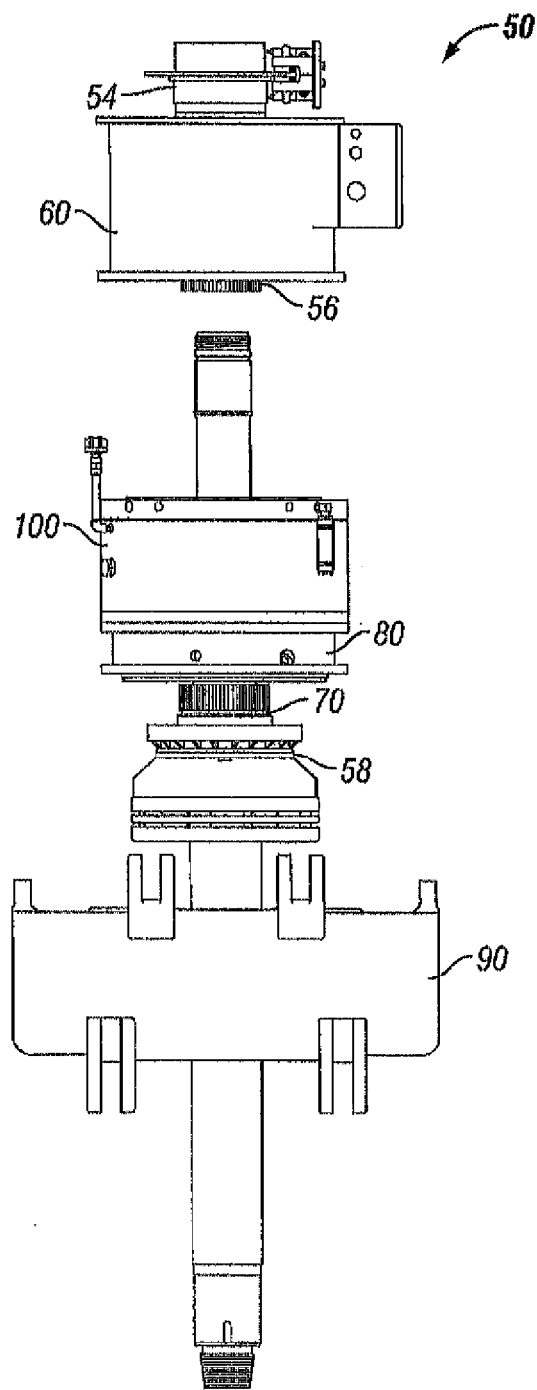
FIG. 3 is a rear view of a top drive system of according to the present invention.

FIG. 3 shows a top drive system 50 (partially exploded view) according to the present invention. A motor 60 has a brake system 54 and an output shaft 56. The output shaft 56 is connected to a gear system 100. The gear system 100 driven by the motor 60, drives a main drive shaft 70. Bearings 58 (thrust bearings) are retained in place by a bearing retainer 80 which is bolted to or integral with the gear system 100. An attachment frame 90 (a "swivel body") provides for the connection of a torque track for conducting torque from the system to the torque track. The swivel body 90 is, typically, suspended from a block in the derrick by bails.

FIGS. 4A-4D show the gear system 100 of the top drive system 50. A housing 102 has a motor mounting surface 104 on which the motor is positioned. A part 107 is releasably secured to the housing with bolts 107b. Gear reducer system 110 within the housing 102 includes a gear reducer 111 and a bearing 116. The gear reducer system 110 includes a first stage carrier 112; a second stage sun pinion 113; a second stage carrier 114; and a bearing cartridge 115. The cartridge 115 with the bearing 117 is held in place by bolts 115x. Removing the bolts 107b and the bolts 115x permits removal of the cartridge 115 for bearing replacement, in one aspect, with a single bearing 117.

Figure 4A:
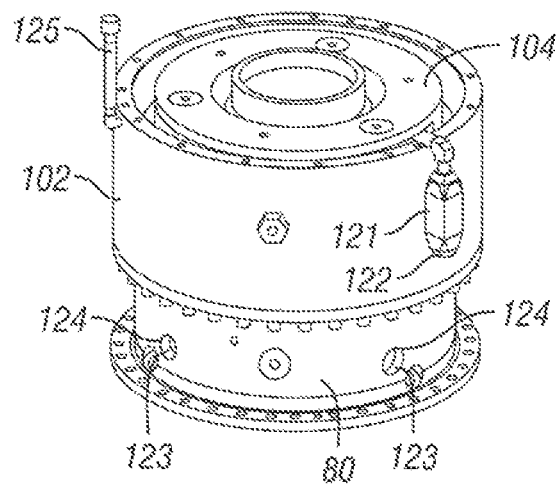
FIG. 4A is a perspective view of a gear apparatus for a top drive system according to the present invention.
Figure 4B:
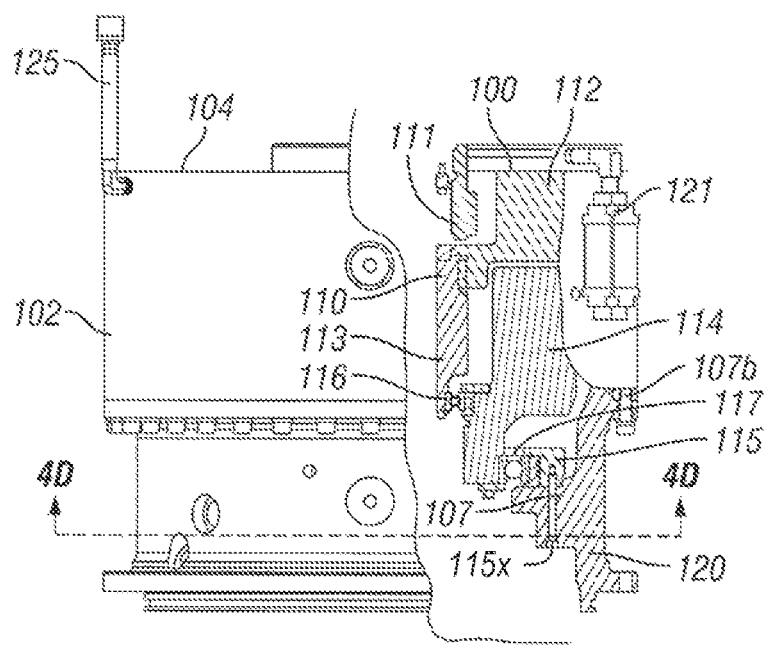
FIG. 4B is a side view partially in cross-section of the apparatus of FIG. 4A (along line 4B-4B of FIG. 4C).
Figure 4C:
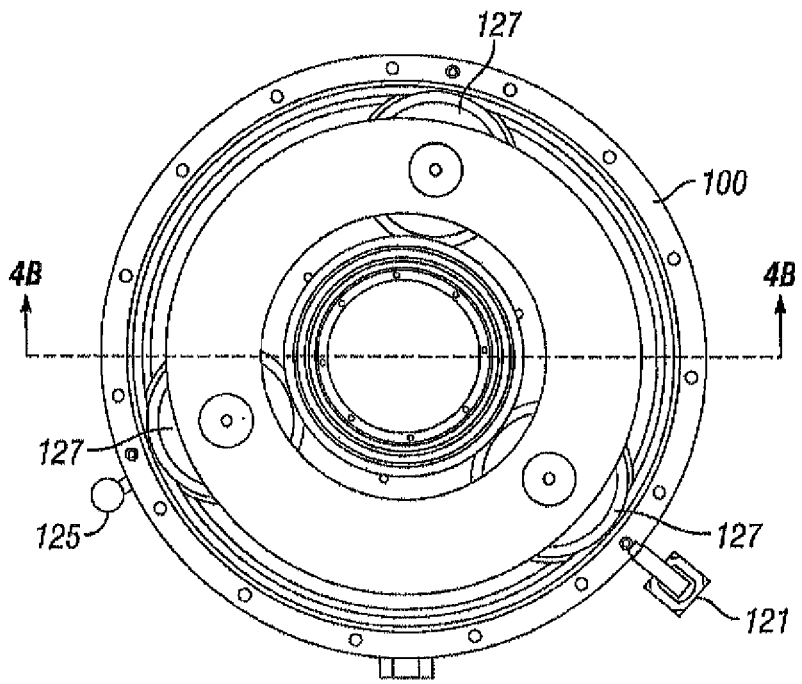
FIG. 4C is a top of the apparatus of FIG. 4A.
Figure 4D:
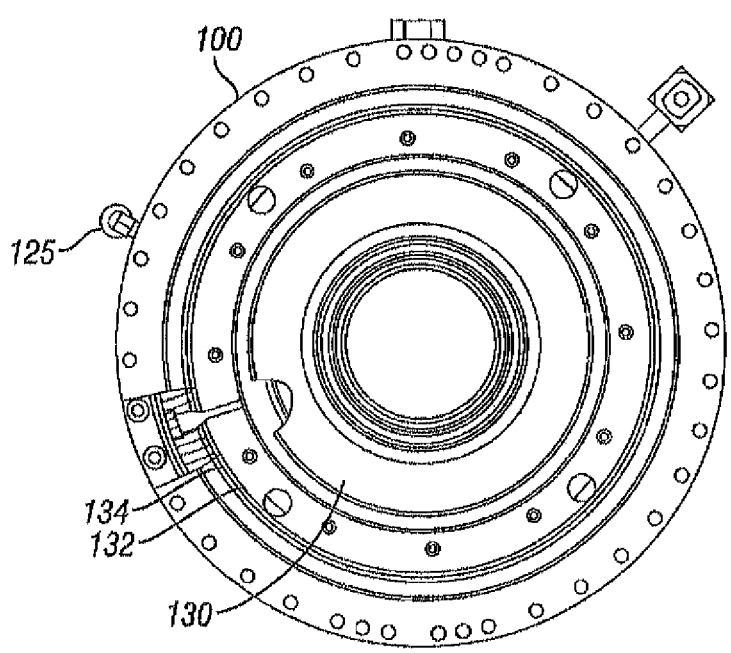
FIG. 4D is a bottom view of the apparatus of FIG. 4A with part in cross-section (along line 4D-4D of FIG. 4B).

There are three first stage planetary gears 127 (see FIG. 4C). The gear system 100 has a bottom surface 130 (see FIG. 4D). A temperature gauge 134 can be inserted in a tapped thread portion 132. A tip of the gauge sits in the oil flow path and dynamically measures the temperature of the oil flow.

Figure 4E:
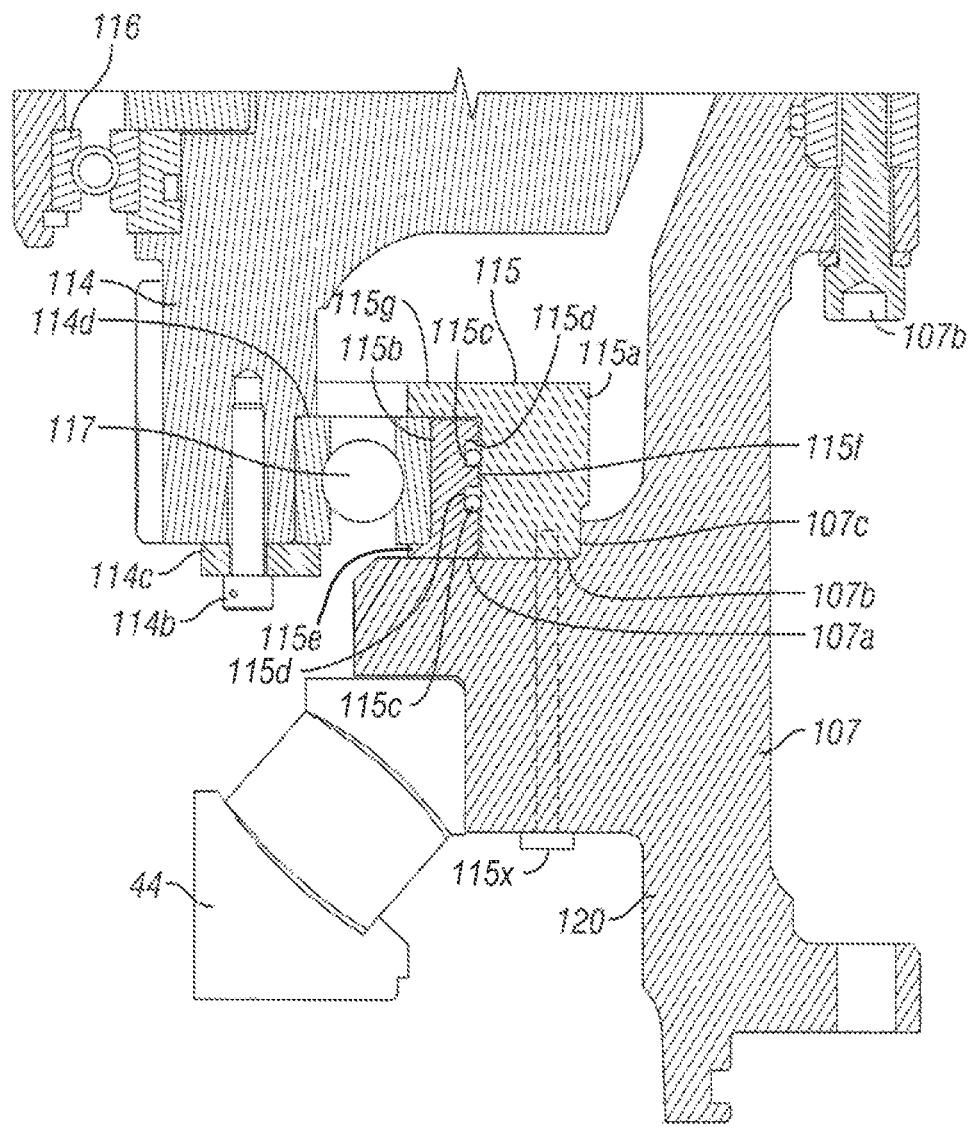
FIG. 4E is an enlargement of part of the apparatus of FIG. 4B.

A lower portion 120 of part 107 of the housing 102 serves as a bearing retainer to retain in place the bearing 44 (see FIG. 4E). An inline flow meter 121 which measures oil flow to the housing has an oil inlet port 122. Magnetic plugs 123 are positioned in holes 124 to attract and hold metal shavings and debris. An air breather 125 is in communication with the interior of the housing 120.

As shown in FIGS. 4B and 4E, the cartridge 115 has a part 115b which is adjacent a part 115a. The part 115a includes an upper part 115g and a side 115f. The part 115b is encompassed within structure of the part 115a (upper part 115g and side 115f) and a top surface 107a of the part 107. The part 115a rests on a top surface 107b of the part 107 and against a side 107c of the part 107. In one aspect, the top surface 107a is lower than top surface 107b.

Due to the tolerances between the part 115b and the part 115a some slight movement is possible of the part 115b with respect to the part 115a. An interface between the parts 115b and 115a is sealed by one or more seals—two o-ring seals 115c are shown in corresponding recesses 115d in the part 115b. These seals are sized, configured, and positioned to accommodate the movement of the part 115b with respect to the part 115a.

The bearing 117 is held in place by a holder 114c bolted to the second stage carrier 114 by bolts 114b and rests partially on a ledge 115e of the part 115b and under a shoulder 114d of the carrier 114. The bearing 117 can move radially (and/or axially) the extent that the part 115b can move radially (and/or axially), thus permitting the bearing 117 when it is movable radially to "float" horizontally. This inhibits interference in the horizontal plane between the bearing 117 and the bearing 44 (which can cause excessive bearing wear and premature failure). The bearing 117 does not float so much that the second stage carrier 114 moves too far axially, i.e., so far that splines on the periphery of the second stage carrier 114 would not properly mesh with corresponding splines on the main shaft of the motor.

The present invention, therefore, provides in some, but not in necessarily all, embodiments a top drive system for wellbore operations, the top drive system including: a main body; a motor apparatus; a main shaft extending from the main body, the main shaft having a top end and a bottom end, the main shaft having a main shaft flow bore therethrough from top to bottom through which drilling fluid is flowable; a quill connected to and around the main shaft; and, in one aspect, the quill is part of a gearbox of a gear system; a gear system interconnected with the quill, the gear system driven by the motor apparatus so that driving the gear system drives the quill and thereby drives the main shaft, the main shaft passing through the gear system; upper components connected to the main body above the top end of the main shaft.

The present invention, therefore, provides in some, but not in necessarily all, embodiments a top drive system for wellbore operations, the top drive system including a motor and gearing system including a motor housing, a motor within the motor housing, and the motor housing comprising a top and a bottom and a plurality of rods interconnected between the top and bottom to connect the top and the bottom together.

The present invention, therefore, provides in some, but not in necessarily all, embodiments a top drive system for wellbore operations, the top drive system including: a main body; a top drive shaft; a motor apparatus; a motor shaft extending from the motor; a gear system driven by the motor shaft, the gear system driven by the motor apparatus so that driving the gear system drives the top drive shaft, the gear system including a lower planetary carrier; the gear system including gear apparatus enclosed within a gear housing; a single bearing adjacent and in contact with the lower planetary carrier; a bearing cartridge connected to the gear housing; and the bearing cartridge abutting the single bearing and in contact with and holding the single bearing in position with respect to the lower planetary carrier. Such a system may have one or some, in any possible combination, of the following: the bearing cartridge including an outer part secured to the gear housing, and an inner part within the outer part, the inner part movable radially with respect to the outer part; the single bearing abuts the inner part and the inner part is movable radially with the single bearing; the single bearing maintains the lower planetary carrier in radial position; a shaft bearing around the top drive shaft, and a bearing retainer portion on a lower part of the gear housing for retaining the shaft bearing; wherein the inner part and the single bearing are movable to inhibit interference in the horizontal plane of the single bearing with the shaft bearing; wherein the motor apparatus is a salient pole permanent magnet motor apparatus; at least one seal on the inner part, the at least one seal projecting from the inner part and abutting the outer part, and the at least one seal accommodates movement of the inner part with respect to the outer part; there are two spaced-apart seal recesses on the inner part, and the at least one seal is two seals, one seal in each seal recess; wherein the bearing cartridge is releasably secured to a first part of the gear housing; and/or wherein the first part is releasably secured to the gear housing.

The present invention, therefore, provides in some, but not in necessarily all, embodiments a top drive system for wellbore operations, the top drive system including: a main body; a top drive shaft; a motor apparatus; a motor shaft extending from the motor; a gear system driven by the motor shaft, the gear system driven by the motor apparatus so that driving the gear system drives the top drive shaft, the gear system including a lower planetary carrier; the gear system including gear apparatus enclosed within a gear housing; a single bearing adjacent and in contact with the lower planetary carrier; a bearing cartridge connected to the gear housing; the bearing cartridge abutting the single bearing and in contact with and holding the single bearing in position with respect to the lower planetary carrier; the bearing cartridge including an outer part secured to the gear housing; an inner part within the outer part, the inner part movable radially with respect to the outer part; the single bearing abuts the inner part and the inner part is movable radially with the single bearing; wherein the single bearing maintains the lower planetary carrier in radial position; a shaft bearing around the top drive shaft; a bearing retainer portion on a lower part of the gear housing for retaining the shaft bearing; and wherein the inner part and the single bearing are movable to inhibit interference in the horizontal plane of the single bearing with the shaft bearing.

The present invention, therefore, provides in some, but not in necessarily all, embodiments a method for facilitating rotation of a lower planetary carrier of a gear system of a top drive system, the top drive system having a motor and gearing system including a motor housing, a motor within the motor housing, and the motor housing being a top and a bottom and a plurality of rods interconnected between the top and bottom to connect the top and the bottom together, the method including: rotating the lower planetary carrier with respect to the single bearing, and holding the single bearing in position with the bearing cartridge. Such a method may have one or some, in any possible combination, of the following: the bearing cartridge including an outer part secured to the gear housing, and an inner part within the outer part, the inner part movable radially with respect to the outer part, wherein the single bearing abuts the inner part and the inner part is movable radially with the single bearing, the method further including allowing the single bearing to move radially to an extent of possible radial movement of the inner part; wherein the single bearing maintains the lower planetary carrier in radial position, the method further including maintaining the lower planetary carrier in position with the single bearing; the top drive system having a shaft bearing around the top drive shaft, and a bearing retainer portion on a lower part of the gear housing for retaining the shaft bearing, the method further including retaining the shaft bearing in position with the bearing retainer portion; wherein the inner part and the single bearing are movable to inhibit interference in the horizontal plane of the single bearing with the shaft bearing, the method further including inhibiting interference in the horizontal plane between the single bearing and the shaft bearing; and/or the top drive system having at least one seal on the inner part, the at least one seal projecting from the inner part and abutting the outer part, the at least one seal accommodates movement of the inner part with respect to the outer part, the method further including with the at least one seal accommodating movement of the inner part with respect to the outer part.

The present invention, therefore, provides in some, but not in necessarily all, embodiments a method for inhibiting interference in the horizontal plane between a single bearing in a gear housing adjacent a lower planetary carrier of a gear system of a top drive system and a shaft bearing around a top drive shaft of the top drive system, the top drive system having a main body, a top drive shaft, a motor apparatus, a motor shaft extending from the motor, a gear system driven by the motor shaft, the gear system driven by the motor apparatus so that driving the gear system drives the top drive shaft, the gear system including a lower planetary carrier, the gear system including gear apparatus enclosed within a gear housing, a single bearing adjacent and in contact with the lower planetary carrier, a bearing cartridge connected to the gear housing, and the bearing cartridge abutting the single bearing and in contact with and holding the single bearing in position with respect to the lower planetary carrier, the method including allowing the single bearing to move radially with respect to the gear housing in a controlled manner.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. 102 and satisfies the conditions for patentability in section. 102. The invention claimed herein is not obvious in accordance with 35 U.S.C. 103 and satisfies its conditions for patentability. This specification is in accordance with the requirements of 35 U.S.C. 112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes.

Whereas the present invention has been described in particular relation to the drawings attached hereto, it should be understood that other and further modifications apart from those shown or suggested herein, may be made within the scope and spirit of the present invention.

What is claimed is:

1. A system, comprising:
    a gear system comprising a gear housing and a lower planetary carrier disposed in said gear housing, said lower planetary carrier being adapted to rotate relative to said gear housing;
    a top drive system operatively coupled to said gear system, said top drive system comprising a top drive shaft that is adapted to be driven by said gear system;
    a single bearing positioned between said gear housing and said lower planetary carrier, said single bearing being adapted to facilitate a rotation of said lower planetary carrier relative to said gear housing;
    a motor apparatus operatively coupled to said gear system, said motor apparatus being adapted to drive said gear system by rotating said lower planetary carrier relative to said gear housing, wherein a rotational axis of said single bearing is adapted to move in a lateral translational direction with respect to said gear housing while said motor apparatus is rotating said lower planetary carrier and while said gear system is driving said top drive shaft.

2. The system of claim 1, wherein said single bearing is adapted to maintain said lower planetary carrier in position during said rotation of said lower planetary carrier relative to said gear housing.

3. The system of claim 1, further comprising a bearing cartridge that is adapted to maintain said single bearing in said position between said gear housing and said lower planetary carrier.

4. The system of claim 3, wherein said bearing cartridge comprises an outer part that is releasably secured to said gear housing and a radially movable inner part encompassed by said outer part.

5. The system of claim 4, wherein said single bearing is adapted to abut said radially movable inner part of said bearing cartridge.

6. The system of claim 4, wherein a centerline axis of said radially movable inner part is adapted to move in a second lateral translational direction while said motor apparatus is rotating said lower planetary carrier and while said gear system is driving said top drive shaft.

7. The system of claim 4, further comprising at least one seal positioned between said outer part of said bearing cartridge and said radially movable inner part of said bearing cartridge, said at least one seal being adapted to accommodate said movement of said single bearing in said lateral translational direction.

8. The system of claim 4, wherein said radially movable inner part of said bearing cartridge is adapted to limit an amount of said movement of said single bearing in said lateral translational direction.

9. The system of claim 1, wherein said top drive system comprises a shaft bearing that is adapted to be retained in position with a bearing retainer portion of said gear housing.

10. The system of claim 9, wherein said gear housing comprises a lower gear housing part that is releasably secured to an upper gear housing part, said lower gear housing part comprising said bearing retainer portion.

11. The system of claim 9, wherein said rotational axis of said single bearing is adapted to move in said lateral translational direction so as to inhibit rotational interference between said single bearing and said shaft bearing while said motor apparatus is rotating said lower planetary carrier and while said gear system is driving said top drive shaft.

12. A system, comprising:
    a gear system comprising a gear housing and a lower planetary carrier disposed in said gear housing, said lower planetary carrier being adapted to rotate relative to said gear housing;
    a single bearing positioned between said gear housing and said lower planetary carrier, said single bearing being adapted to facilitate a rotation of said lower planetary carrier relative to said gear housing;
    a bearing cartridge that is adapted to maintain said single bearing in said position between said gear housing and said lower planetary carrier, said bearing cartridge comprising an outer part that is releasably secured to said gear housing and a radially movable inner part encompassed by said outer part, said single bearing abutting said radially movable inner part; and a motor operatively coupled to said gear system, said motor being adapted to rotate said lower planetary carrier relative to said gear housing, wherein a rotational axis of said single bearing and a centerline axis of said radially movable inner part are adapted to move in respective lateral translational directions during said rotation of said lower planetary carrier relative to said gear housing.

13. The system of claim 12, wherein said single bearing is adapted to maintain said lower planetary carrier in position during said rotation of said lower planetary carrier relative to said gear housing.

14. The system of claim 12, further comprising a top drive system operatively coupled to said gear system.

15. The system of claim 14, wherein said top drive system comprises a top drive shaft and a shaft bearing, said shaft bearing being adapted to be retained in position with a bearing retainer portion of said gear housing.

16. The system of claim 15, wherein said gear housing comprises a lower gear housing part that is releasably secured to an upper gear housing part, said lower gear housing part comprising said bearing retainer portion.

17. The system of claim 15, wherein said rotational axis of said single bearing is adapted to move in said respective lateral translational direction so as to inhibit rotational interference between said single bearing and said shaft bearing during said rotation of said lower planetary carrier relative to said gear housing.

18. The system of claim 12, further comprising at least one seal positioned between said outer part of said bearing cartridge and said radially movable inner part of said bearing cartridge, said at least one seal being adapted to accommodate said movement of said single bearing in said lateral translational direction.

19. The system of claim 12, wherein said radially movable inner part of said bearing cartridge is adapted to limit an amount of said movement of said single bearing in said lateral translational direction.

* * * * *